United States Patent
Boni et al.

(10) Patent No.: US 10,127,323 B1
(45) Date of Patent: *Nov. 13, 2018

(54) EXTRACTIVE QUERY-FOCUSED MULTI-DOCUMENT SUMMARIZATION

(71) Applicant: INTERNATIONAL BUSINESS MACHINES CORPORATION, Armonk, NY (US)

(72) Inventors: Odellia Boni, Giva'at Ela (IL); Guy Feigenblat, Givataym (IL); David Konopnicki, Haifa (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/660,034

(22) Filed: Jul. 26, 2017

(51) Int. Cl.
*G06F 7/00* (2006.01)
*G06F 17/30* (2006.01)

(52) U.S. Cl.
CPC .. *G06F 17/30867* (2013.01); *G06F 17/30011* (2013.01); *G06F 17/30663* (2013.01); *G06F 17/30719* (2013.01); *G06F 17/30976* (2013.01); *G06F 17/30991* (2013.01)

(58) Field of Classification Search
None
See application file for complete search history.

(56) References Cited

U.S. PATENT DOCUMENTS

| | | | | |
|---|---|---|---|---|
| 5,940,816 A | * | 8/1999 | Fuhrer | G06Q 10/06 706/13 |
| 7,171,351 B2 | * | 1/2007 | Zhou | G06F 17/30672 704/9 |
| 7,310,633 B1 | * | 12/2007 | Wang | G06F 17/30696 707/742 |

(Continued)

OTHER PUBLICATIONS

Wikipedia, "ROUGE (metric)", https://en.wikipedia.org/w/index.php?title=ROUGE_(metric)&oldid=776265595, printed Apr. 25, 2017, pp. 1-2.

(Continued)

*Primary Examiner* — Uyen Le
(74) *Attorney, Agent, or Firm* — Michael O'Keefe

(57) ABSTRACT

A method, computer system, and computer program product for generating a multi-document summary is provided. The embodiment may include receiving a query statement, one or more documents, one or more summary constraints, and quality goals. The embodiment may include identifying one or more keywords within the query statement. The embodiment may include performing a sentence selection from the one or more documents based on the one or more identified keywords. The embodiment may include generating a plurality of candidate summaries of the one or more documents based on the performed sentence selection, the goals, and a cross entropy method. The embodiment may include calculating a quality score for each of the plurality of generated candidate summaries using a plurality of quality features. The embodiment may include selecting a candidate sum- (Continued)

mary from the plurality of generated candidate summaries with the highest calculated quality score that also satisfies a quality score threshold.

20 Claims, 7 Drawing Sheets

(56) References Cited

U.S. PATENT DOCUMENTS

| | | | | |
|---|---|---|---|---|
| 7,549,114 | B2* | 6/2009 | Bederson | G06F 17/214 715/200 |
| 7,607,083 | B2* | 10/2009 | Gong | G06F 17/27 704/245 |
| 8,271,502 | B2 | 9/2012 | Svore et al. | |
| 8,402,369 | B2 | 3/2013 | Zhu et al. | |
| 8,984,398 | B2* | 3/2015 | Kanungo | G06F 17/30719 707/748 |
| 9,037,590 | B2* | 5/2015 | Kumar | G06F 17/30713 707/737 |
| 9,116,984 | B2* | 8/2015 | Caldwell | G06F 17/30719 |
| 9,218,414 | B2 | 12/2015 | Soubbotin | |
| 2004/0052505 | A1* | 3/2004 | Ahmad | G11B 27/034 386/202 |
| 2007/0073683 | A1* | 3/2007 | Kobayashi | G06F 17/30719 |
| 2008/0270119 | A1 | 10/2008 | Suzuki | |
| 2012/0240032 | A1 | 9/2012 | McKeown et al. | |
| 2015/0302083 | A1 | 10/2015 | Simske et al. | |
| 2017/0161259 | A1 | 6/2017 | Zhao | |
| 2017/0228457 | A1* | 8/2017 | Billawal | G06F 17/30719 |

OTHER PUBLICATIONS

Nenkova, et al., "Automatic Summarization", NOW, the essence of knowledge, Foundations and Trends in Information Retrieval, vol. 5, Nos. 2-3 (2011) 103-233, copyright 2011, DOI: 101561/1500000015, pp. 1-133.

Das, et al., "A Survey on Automatic Text Summarization", Language Technologies Institute Carnegie Mellon University, Technical Report, Nov. 21, 2007, pp. 1-31.

Tabassum, et al., "A review of recent progress in multi document summarization", Proceedings of the 10th Doctoral Symposium in Informatics Engineering—DSIE'15, 1st Edition, 2015—ISBN: 978-972-752-173-9 pp. 48-59.

Nenkova, et al., "A Survey of Text Summarization Techniques", Mining Text Data, Chapter 3, DOI 10.1007/978-1-4614-3223-4_3, © Springer Science+Business Media, LLC, 2012, pp. 43-76.

Lin, et al., "Multi-document Summarization via Budgeted Maximization of Submodular Functions", Published in: Proceeding HLT '10 Human Language Technologies: The 2010 Annual Conference of the North American Chapter of the Association for Computational Linguistics, Los Angeles, California—Jun. 2-4, 2010, Association for Computational Linguistics, Stroudsburg, PA, USA © 2010, table of contents ISBN:1-932432-65-5, pp. 912-920.

Lin, et al., "A Class of Submodular Functions for Document Summarization", Proceedings of the 49th Annual Meeting of the Association for Computational Linguistics, Portland, Oregon, Jun. 19-24, 2011, c 2011, Association for Computational Linguistics, pp. 510-520.

Saleh, et al., "Extractive Multi-Document Text Summarization Using Multi-Objective Evolutionary Algorithm Based Model", Iraqi Journal of Science, 2016, vol. 57, No. 1C, pp. 728-741.

Huang, et al., "Modeling Document Summarization as Multi-objective Optimization", Intelligent Information Technology and Security Informatics (IITSI), 2010 Third International Symposium on Apr. 2-4, 2010, Conference Location: Jian, China, China, DOI: 10.1109/IITSI.2010.80, Publisher: IEEE, pp. 382-386.

Kurland, "The Cluster Hypothesis in Information Retrieval", SIGIR 2013 tutorial, http://iew3.technion.ac.il/~kurland, Slides are available at: http://iew3.technion.ac.il/~kurland/clustHypothesisTutorial.pdf, pp. 1-120.

Wikipedia, et al., "Cross-entropy method", https://en.wikipedia.org/w/index.php?title=Cross-entropy_method&oldid=750211921 printed Apr. 25, 2017, pp. 1-3.

De Boer, et al., "A Tutorial on the Cross-Entropy Method", Annals of Operations Research 134, 19-67, 2005, c 2005 Springer Science + Business Media, Inc., Manufactured in The Netherlands, pp. 19-67.

Radev, et al., "Centroid-based summarization of multiple documents", Elsevier Ltd. All rights reserved, www.elsevier.com/locate/infoproman, Information Processing and Management 40 (2004), pp. 919-938.

Wan, et al., "Multi-Document Summarization Using Cluster-Based Link Analysis", SIGIR'08: Proceedings of the 31st Annual International ACM SIGIR conference on Research and development in information retrieval, Jul. 20-24, 2008, Singapore, Copyright 2008, pp. 299-306.

Wang, et al., "Multi-Document Summarization via Sentence-Level Semantic Analysis and Symmetric Matrix Factorization", SIGIR'08: Proceedings of the 31st Annual International ACM SIGIR conference on Research and development in information retrieval, Jul. 20-24, 2008, Singapore, Copyright 2008, pp. 307-314.

Perez-Pinillos, et al., "Modeling Motivations, Personality Traits and Emotional States in Deliberative Agents Based on Automated Planning", ICAART 2011, CCIS 271, pp. 146-160, 2012, c Springer-Verlag Berlin Heidelberg 2012.

Malatesta, et al., "Agent Personality Traits in Virtual Environments Based on Appraisal Theory Predictions", AISB'07: Artificial and Ambient Intelligence, Language, Speech and Gesture for Expressive Characters, Newcastle upon Tyne, UK, 2007, pp. 1-5.

Guy, et al., "Simulating Heterogeneous Crowd Behaviors Using Personality Trait Theory", Eurographics/ ACM SIGGRAPH Symposium on Computer Animation (2011), Copyright The Eurographics Association 2011, pp. 1-10.

Doce, et al., "Creating Individual Agents through Personality Traits", Intelligent Virtual Agents: 10th International Conference, IVA 2010, Philadelphia, PA—Sep. 20-22, 2010, copyright Springer-Verlag Berlin, Heidelberg © 2010, pp. 257-264.

Newitz, "Almost None of the Women in the Ashley Madison Database Ever Used the Site", Gizmodo, http://gizmodo.com/almost-none-of-the-women-in-the-ashley-madison-database-1725558944, Aug. 26, 2015, pp. 1-22.

Boni et al., U.S. Appl. No. 15/843,993, filed Dec. 15, 2017, titled "Extractive Query-Focused Multi-Document Summarization", pp. 1-33.

IBM: List of IBM Patents or Patent Applications Treated as Related (Appendix P), Mar. 20, 2018, pp. 1-2.

* cited by examiner

EXTRACTIVE QUERY-FOCUSED MULTI-DOCUMENT SUMMARIZATION

BACKGROUND

The present invention relates, generally, to the field of computing, and more particularly to natural language processing.

Natural language processing may relate to a field within computer science dealing with the analysis of natural language text by a computer. Natural language processing may have applications in various categories, such as syntax, semantics, discourse, and speech. Various applications within the mentioned categories include text-to-speech, discourse analysis, relationship extraction, natural language generation, sentiment analysis, parsing, word segmentation, terminology extraction, machine translation, and summarization.

SUMMARY

According to one embodiment, a method, computer system, and computer program product for generating a multi-document summary is provided. The embodiment may include receiving a query statement, one or more documents, one or more summary constraints, and one or more goals. The embodiment may also include identifying one or more keywords within the query statement. The embodiment may further include performing a sentence selection from the one or more documents based on the one or more identified keywords. The embodiment may also include generating a plurality of candidate summaries of the one or more documents based on the performed sentence selection, the one or more goals, and a cross entropy method. The embodiment may further include calculating a quality score for each of the plurality of generated candidate summaries using a plurality of quality features. The embodiment may also include selecting a candidate summary from the plurality of generated candidate summaries with the highest calculated quality score that also satisfies a quality score threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
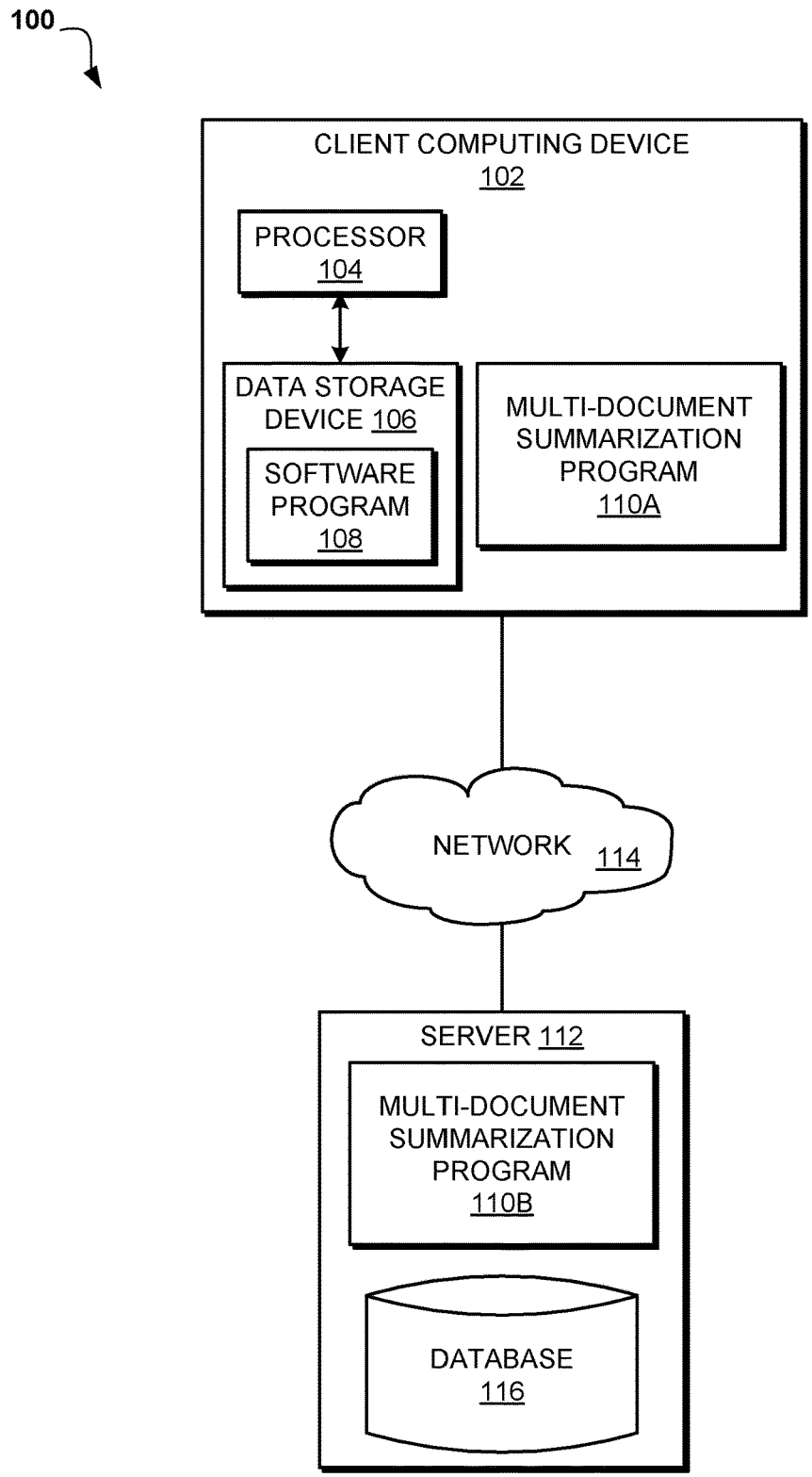
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to natural language processing. The following described exemplary embodiments provide a system, method, and program product to, among other things, extract sentences from a corpus of documents to use in generating a summary of the documents that satisfies a user-defined goal and a provided summary constraint. Therefore, the present embodiment has the capacity to improve the technical field of natural language processing by utilizing centroid-level analysis to provide a high quality extractive-based, unsupervised text summary without requiring domain knowledge.

As previously described, natural language processing may relate to a field within computer science dealing with the analysis of natural language text by a computer. Natural language processing may have applications in various categories, such as syntax, semantics, discourse, and speech. Various applications within the mentioned categories include text-to-speech, discourse analysis, relationship extraction, natural language generation, sentiment analysis, parsing, word segmentation, terminology extraction, machine translation, and summarization.

Within the field of natural language processing, summarization, or automatic text summarization, may relate to extracting fragments of text from a corpus that condenses the corpus to a shorter length that retains the crux of the corpus. Various methods of summarization currently exist that can be categorized into two main dimensions: extractive vs. abstractive and supervised vs. unsupervised. Extractive-based summarization relates to extracting objects from a corpus without modification. For example, whole sentences may be removed from a document without modification to create a short summary of the document. Abstraction-based summarization relates to paraphrasing sections of a document to produce a document summary. Typically, abstraction-based summarization programs are more difficult to develop than extractive-based summarization programs.

Supervised summarization relates to using a model and training data to select the most appropriate text fragments to include within a summary. Conversely, unsupervised summarization relies on an algorithm to identify and select the text fragments to include in a summary rather than relying on, usually a large amount of, training data. While supervised methods have typically provided better quality, such methods require more domain knowledge than unsupervised summarization methods. As such, it may be advantageous to, among other things, utilize an extractive-based, unsupervised summarization program to generate a text summarization that produces a quality summary without necessitating the presence of training data.

According to one embodiment, a set of sentences may be extracted from various documents within a corpus to be compiled into a summary that satisfies a user-preconfigured summary length constraint. A set of summaries may be iteratively generated so that each may be evaluated and assigned a quality score based on how accurately each summary satisfies one or more quality goals such as how the summary adequately describes the corpus, the user-entered query statement etc. An efficient global optimization fully-polynomial randomized approximation scheme (FPRAS) based on the cross-entropy method may be utilized to generate each summary that maximizes the quality goal while satisfying the summary length constraint.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate a query-focused multi-document summarization using an extractive-based, unsupervised summarization program.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a multi-document summarization program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a multi-document summarization program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the multi-document summarization program 110A, 110B may be a program capable of analyzing a corpus to extract sentences that satisfy a quality goal, or threshold, as determined from a query statement. The extracted sentences may be used to generate multiple summaries that are each evaluated for quality and filtered out if an assigned quality score does not satisfy a quality threshold. Once a stopping criterion is met, the multi-document summarization program 110A, 110B may present the highest quality score summary to a user. The collaborative moment method is explained in further detail below with respect to FIG. 2.

Figure 2A:
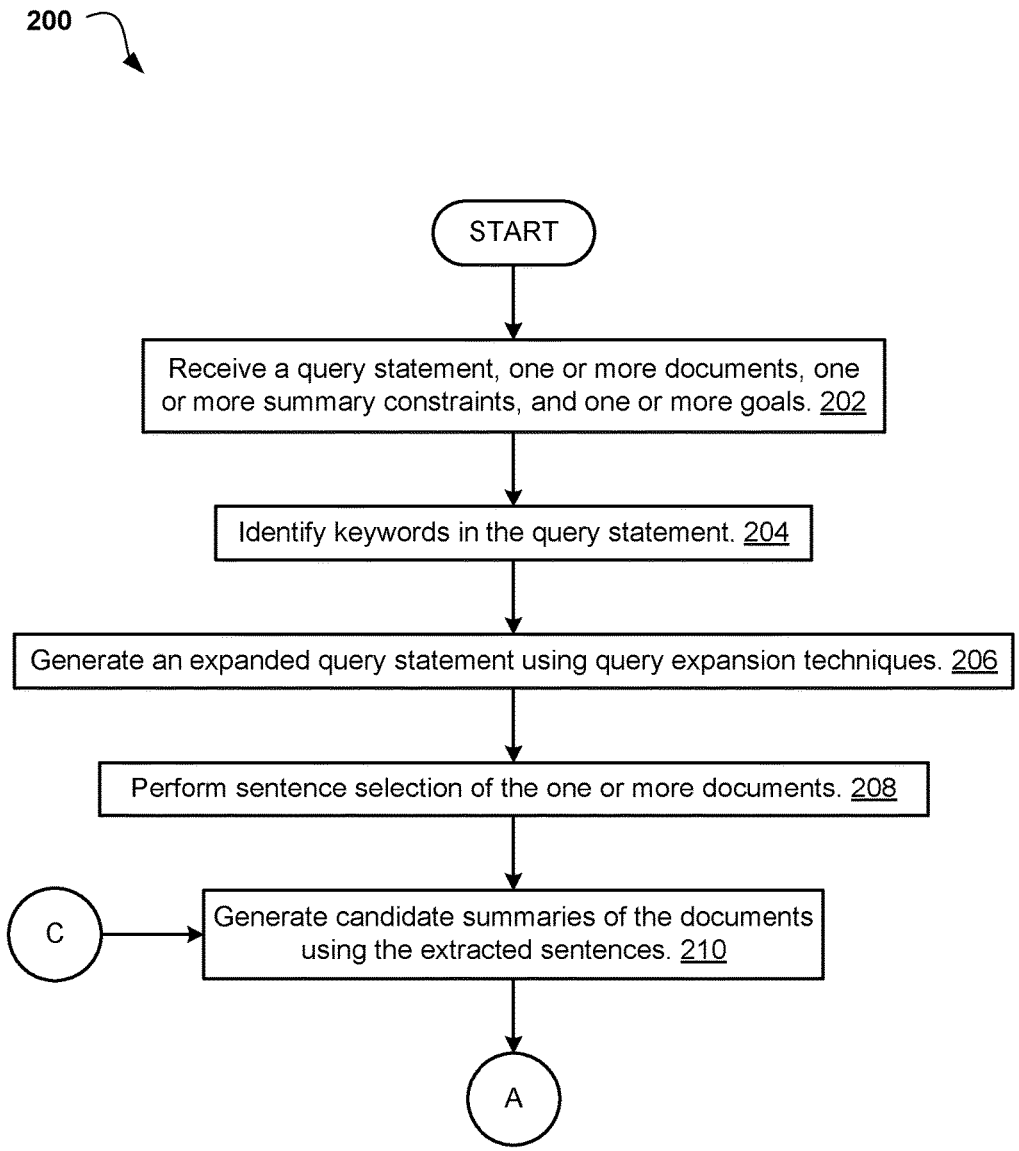
FIGS. 2A-2C are an operational flowchart illustrating a multi-document summarization process according to at least one embodiment.
Figure 2B:
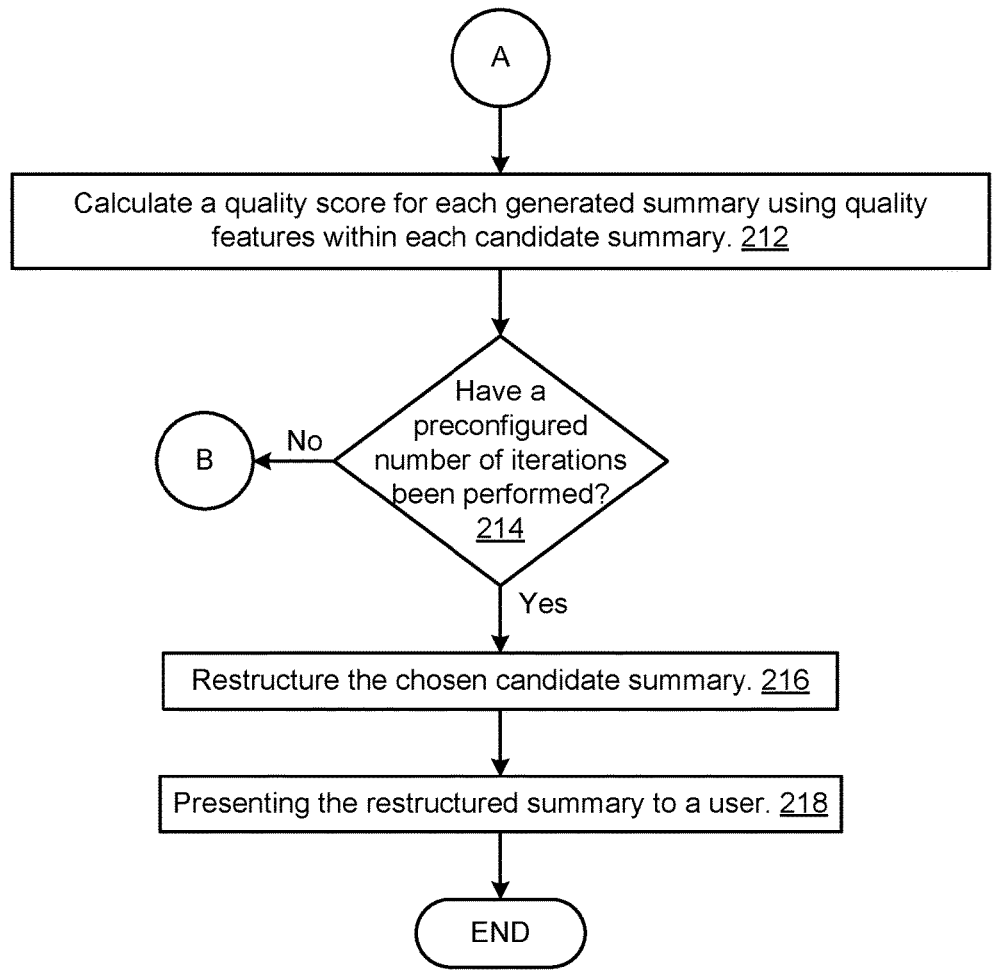
Figure 2C:
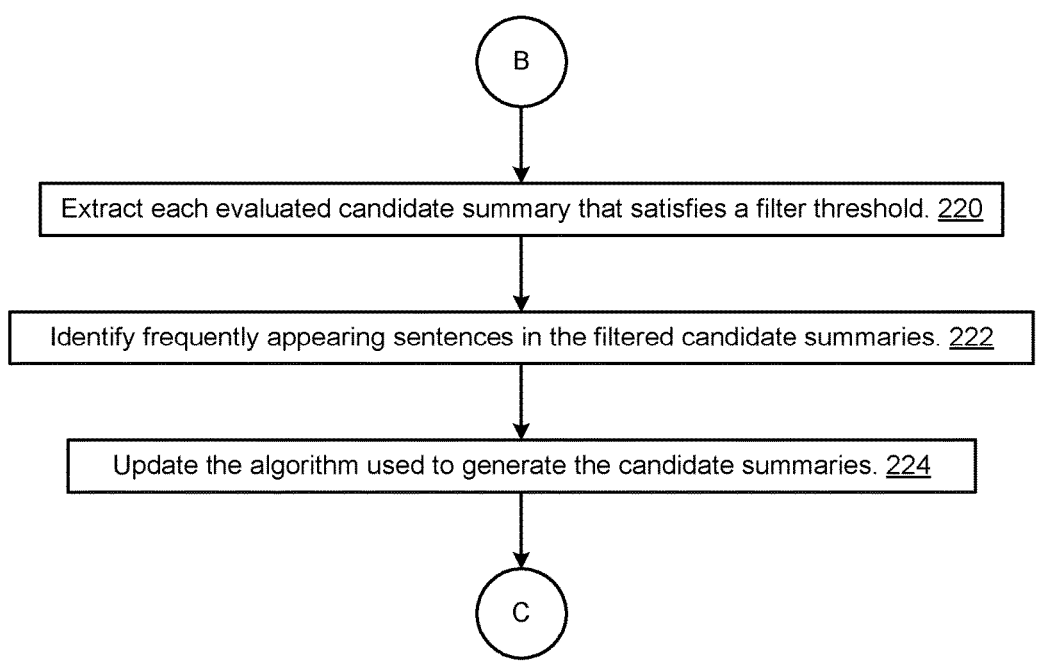

Referring now to FIGS. 2A-2C, an operational flowchart illustrating a multi-document summarization process 200 is depicted according to at least one embodiment. In FIG. 2A, at 202, the multi-document summarization program 110A, 110B receives a query statement, one or more documents, one or more summary constraints, and one or more goals. The query statement may be a user-entered series of words that relates to a particular topic or asks a question towards which the user desires more information. For example, a user may enter the query statement "What is the state of the United States economy?" and expect results relating to the current state of the United States economy. The one or more documents may be a corpus of information in which the multi-document summarization program 110A, 110B may search within based on the query statement. The one or more documents may be articles, stories, papers, repositories, or any other media with which the multi-document summarization program 110A, 110B may be capable of searching and summarizing. The one or more summary constraints may be factors that impact the generated summary. For example, a length constraint may limit each generated summary to a particular word count. Similarly, each generated summary may be limited to a preconfigured number of sentences. The one or more goals may be criteria the multi-document summarization program 110A, 110B may aim to achieve when drafting the summary of the one or more documents. For example, the user may establish a goal for the multi-document summarization program 110A, 110B to generate a summary that is comprised of sentences as short as possible but covers as many subjects as possible from the one or more documents. Whereas the summary constraints are fixed and must be adhered to by the multi-document summarization program 110A, 110B when generating the summary, the one or more goals may be more fluid to allow various generated summaries that each may be evaluated for quality.

Then, at 204, the multi-document summarization program 110A, 110B identifies keywords in the received query statement. In order to effectively generate a summary that answers the query statement, the multi-document summarization program 110A, 110B may identify keywords within the query statement using known text analysis techniques. For example, in the previously discussed query statement, "What is the state of the United States economy?", the words "state" and "economy" and the phrase "United States" may be identified as keywords since each relates to an important aspect of the query statement.

Next, at 206, the multi-document summarization program 110A, 110B generates an expanded query statement using known query expansion techniques on the identified keywords. Query expansion may relate to the process of finding other words or phrases that are relevant to the query statement or identified keywords in an attempt to improve retrieved results. For example, for the identified keywords "state", "economy", and "United States", the multi-document summarization program 110A, 110B may use known query expansion techniques, such as RM3, to identify the related keywords "dollar" and "unemployment." Therefore, sentences containing the keywords "dollar" and "unemployment" may contain information that is relevant to the identified keywords "state", "economy", and "United States".

Then, at 208, the multi-document summarization program 110A, 110B performs sentence selection on the one or more documents. The multi-document summarization program 110A, 110B may perform the sentence selection process by parsing each received document to identify one or more sentences relevant to the expanded query statement. The multi-document summarization program 110A, 110B may perform sentence selection as the first step of a constrained global optimization problem where the goal may be to find a subset of sentences within the one or more documents that maximize a given quality target function. In order to identify the sentences during the first step of the constrained global optimization problem, the multi-document summarization program 110A, 110B may parse through each received document to identify and extract sentences according to known sentence filtering techniques, such as keyword identification or similarity score rating. For example, using a keyword identification approach, the multi-document summarization program 110A, 110B may analyze the received documents to identify each sentence that contains or is related to the keywords "state", "economy", "United States", "dollar", and "unemployment." Each sentence identified during sentence selection may be a candidate to be included within a generated summary.

Then, at 210, the multi-document summarization program 110A, 110B generates candidate summaries of the documents using the sentences identified during sentence selection. The multi-document summarization program 110A, 110B may utilize an unsupervised approach based on the Cross Entropy Method to direct the generation towards better quality summaries. The Cross Entropy Method is a Monte-Carlo framework utilizing a Stochastic algorithm that is capable of solving hard combinatorial optimization problems based on rare event estimation. A Stochastic algorithm is an iterative optimization method that utilizes random variables. For example, the multi-document summarization program 110A, 110B may generate 100 summaries by selecting individual sentences from the identified sentences using a random variable for each sentence representing the sentence's chance of being selected for inclusion in a candidate summary. Furthermore, the total number of summaries generated by the multi-document summarization program 110A, 110B may be preconfigured by a user or based on system limitations, such as computing power.

In at least one embodiment, the multi-document summarization program 110A, 110B may generate the candidate summaries without consideration for the preconfigured summary constraints, and filter out the candidate summaries that do not satisfy the summary constraints once generation is complete. For example, if a summary constraint establishes all generated summaries are to be 10 sentences or less, the multi-document summarization program 110A, 110B may generate a candidate summary that is 11 sentences in length and delete the 11-sentence candidate summary through a filtering process once all candidate summaries in the iteration are generated.

The generation of candidate summaries may be an iterative process performed by the multi-document summarization program 110A, 110B. When proceeding through a first iteration of generating candidate summaries, the multi-document summarization program 110A, 110B may apply equal probability to all sentences selected in step 208. Therefore, each sentence may have an equal chance of being included in a candidate summary. However, in subsequent iterations, the multi-document summarization program 110A, 110B may apply an updated algorithm from step 224 that increases the selection probability for sentences that appear in summaries receiving high quality scores.

Referring now to FIG. 2B, at 212, the multi-document summarization program 110A, 110B calculates a quality score for each generated summary based on quality features formulated in the one or more received goals. After generating each of the summaries, the multi-document summarization program 110A, 110B may evaluate each candidate summary by assigning a score to each generated summary that evaluates each summary's quality as represented through a quality goals. The score may be any rating system of evaluating quality, such as a 0-100 point system or a letter grade system. The quality features utilized by the multi-document summarization program 110A, 110B may include measuring the Bhattacharyya similarity between the unigram language model (LM) of the query and the unigram LM of the summary, measuring the relative mass that the summary devotes to the query, measuring to what extent the summary generally covers the one or more documents, measuring each summary's sentence diversity by calculating the bigram LM entropy for each summary, biasing sentence selection towards sentences that appear earlier in the containing document, and biasing sentence selection towards longer summaries that still satisfy the length constraint that contain few long sentences rather than summaries that contain many short sentences.

Then, at 214, multi-document summarization program 110A, 110B determines whether a preconfigured number of iterations have been performed. According to one implementation, the multi-document summarization process 200 may continue along the operational flowchart if a preconfigured number of iterations have been performed. The multi-document summarization program 110A, 110B may iterate through summary generation a number of times so that a sufficient number of summaries may be generated to provide an accurate, quality summary. If the multi-document summarization program 110A, 110B determines a preconfigured number of iterations have been performed (step 214, "Yes" branch), the multi-document summarization program 110A, 110B may identify the candidate summary with the highest calculated quality score from step 212 and the multi-document summarization process 200 may continue to step 216 to restructure the identified summary. If the multi-document summarization program 110A, 110B determines a preconfigured number of iterations have not been performed (step 214, "No" branch), the multi-document summarization process 200 may continue to step 220 to filter out each evaluated candidate summary that does not satisfy a filter threshold.

In another embodiment, the multi-document summarization program 110A, 110B may determine whether an improvement to the target function is made. According to one implementation, the multi-document summarization process 200 may continue along the operational flowchart if no improvements are made to the target function thereby improving the quality of the generated summaries. If the multi-document summarization program 110A, 110B determines no improvement to the target function is made, the multi-document summarization program 110A, 110B may identify the candidate summary with the highest calculated quality score and the multi-document summarization process 200 may continue to step 216 to restructure the chosen summary. If the multi-document summarization program 110A, 110B determines an improvement to the target function is made, the multi-document summarization program 110A, 110B may determine higher quality summaries may be generated using the updated target function and the multi-document summarization process 200 may continue to step 220 to filter out each evaluated candidate summary that does not satisfy a filter threshold.

In yet another embodiment, the multi-document summarization program 110A, 110B may determine whether a quality score for a candidate summary satisfies a quality score threshold. According to one implementation, the multi-document summarization process 200 may continue along the operational flowchart if the quality score associated with a candidate summary satisfies a quality score threshold. The multi-document summarization program 110A, 110B may compare the calculated quality score for each candidate summary against a user preconfigured quality score threshold to determine if the quality score associated with any of the evaluated candidate summaries satisfy the threshold. If the multi-document summarization program 110A, 110B determines a quality score does satisfy the quality score threshold, the multi-document summarization program 110A, 110B may determine that the candidate summary associated with the quality score should be selected as a quality summary of the one or more documents and the multi-document summarization process 200 may continue to step 216 to restructure the chosen summary. If the multi-document summarization program 110A, 110B determines a quality score does not satisfy the quality score threshold, the multi-document summarization program 110A, 110B may determine that none of the candidate summaries provide a quality summary of the one or more documents and the multi-document summarization process 200 may continue to step 220 to filter out each evaluated candidate summary that does not satisfy a filter threshold.

Next, at 216, the multi-document summarization program 110A, 110B restructures the selected summary. Once the multi-document summarization program 110A, 110B determines that a summary should be selected based on the associated quality score satisfying the quality score threshold, the multi-document summarization program 110A, 110B may analyze the sentence organization of the selected summary and accordingly restructure the sentence organization using known natural language processing techniques based on various preconfigured characteristics, such as sentence length, summary readability, sentence position in the document, which document the sentence belongs to, etc.

Then, at 218, the multi-document summarization program 110A, 110B presents the restructured candidate summary to a user. Once the multi-document summarization program 110A, 110B restructures the selected summary, the multi-document summarization program 110A, 110B may present the selected summary to a user for review. The multi-document summarization program 110A, 110B may present the selected summary to the user by displaying the selected summary on a graphical user interface of a user device, such as a client computing device 102.

Referring now to FIG. 2C, at 220, if the multi-document summarization program 110A, 110B determines a quality score does not satisfy the quality score threshold, the multi-document summarization program 110A, 110B extracts each evaluated candidate summary that satisfies a filter threshold. The filter threshold may be a benchmark which the assigned quality score must meet or exceed in order to remain in the group of candidate summaries being analyzed by the document summarization program 110A, 110B. For example, if a numerical 0-100 grading system was used to evaluate the quality of each summary and the quality threshold is set at 85, the multi-document summarization program 110A, 110B may extract the candidate summaries with corresponding quality scores at or above 85 for further analysis as to what information within the extracted candidate summaries allowed each summary to receive a high quality score. Similarly, if the quality threshold is set to 10%, the multi-document summarization program 110A, 110B may extract all evaluated summaries with quality scores that are within the top 10% of all quality scores within the group of candidate summaries.

Next, at 222, the multi-document summarization program 110A, 110B identifies frequently appearing sentences in the candidate summaries remaining in the group. Of the extracted candidate summaries that do satisfy the filter threshold, the multi-document summarization program 110A, 110B may analyze each remaining candidate summary to identify sentences appearing in multiple candidate summaries with high quality scores. If a sentence appears in multiple summaries with high quality scores, the sentence may be associated with a quality summary for the query statement and should be included in a quality summary. Therefore, the multi-document summarization program 110A, 110B may determine the repeated use of a sentence in multiple high quality score summaries as an indication that the sentence should be included in the generation of subsequent candidate summaries to achieve a high quality summary.

Then, at 224, the multi-document summarization program 110A, 110B updates the algorithm used to generate candidate summaries based on the identified frequently appearing sentences. Once the multi-document summarization program 110A, 110B has evaluated the candidate summaries and identified the frequently appearing sentences, the multi-document summarization program 110A, 110B may update the probabilities of the random variables used to generate candidate summaries in step 210 so that the frequently appearing sentences have higher probabilities and, therefore, more likely to be selected for inclusion in a candidate summary. Therefore, unlike the first iteration of candidate summary generation where each identified sentence had an equal chance of being selected for a candidate summary, the updated algorithm may increase the probability of the identified frequently appearing sentences thereby increasing the chance that the identified sentences are chosen for a candidate summary and improving the quality of each generated candidate summary. Once the candidate summary generation algorithm is updated, the multi-document summarization process 200 may return to step 210 to generate candidate summaries of the one or more documents using the extracted sentences.

It may be appreciated that FIG. 2 provides only an illustration of one implementation and does not imply any limitations with regard to how different embodiments may be implemented. Many modifications to the depicted environments may be made based on design and implementation requirements.

Figure 3:
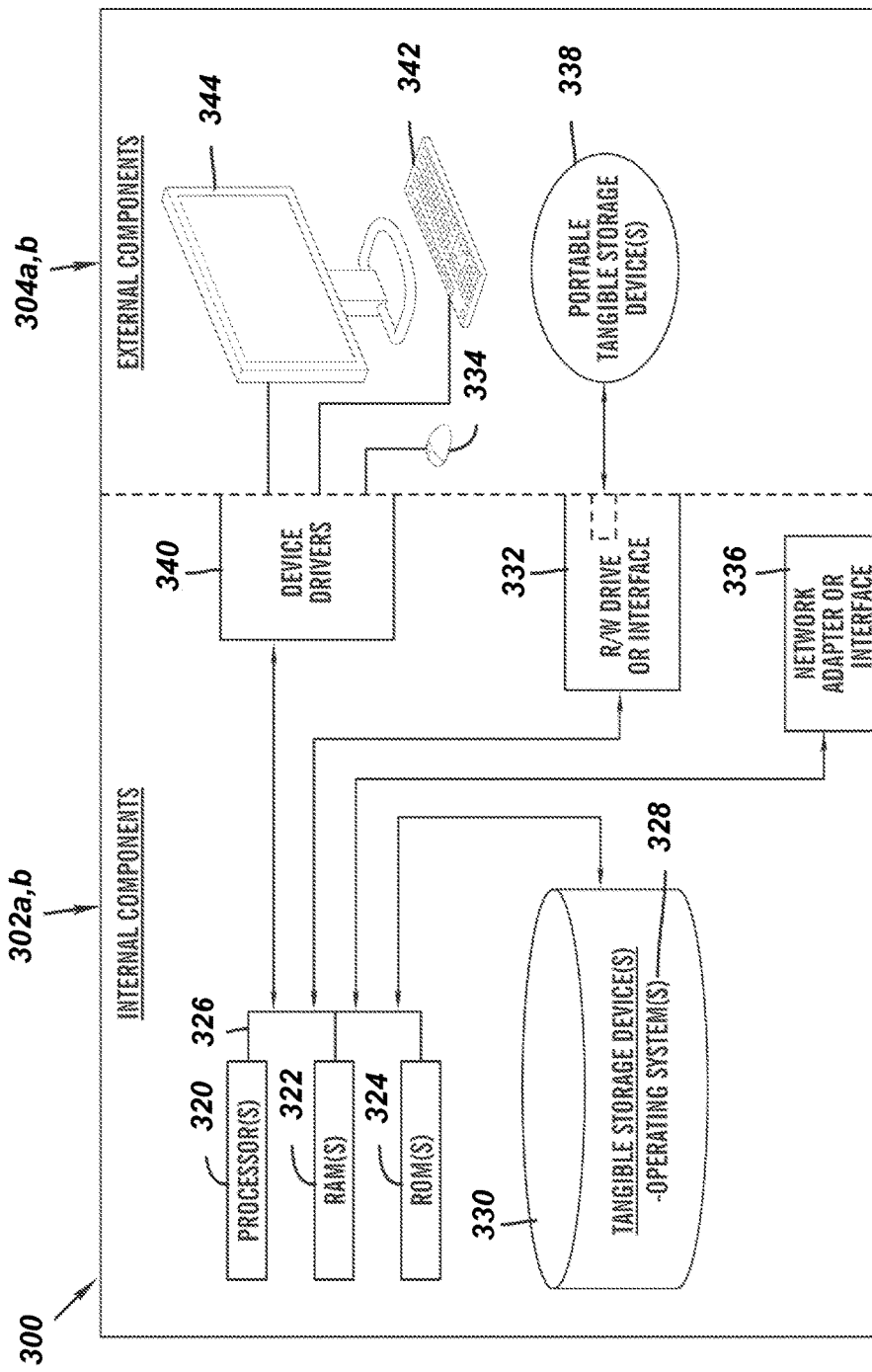
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the multi-document summarization program 110A in the client computing device 102 and the multi-document summarization program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the multi-document summarization program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the multi-document summarization program 110A in the client computing device 102 and the multi-document summarization program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the multi-document summarization program 110A in the client computing device 102 and the multi-document summarization program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
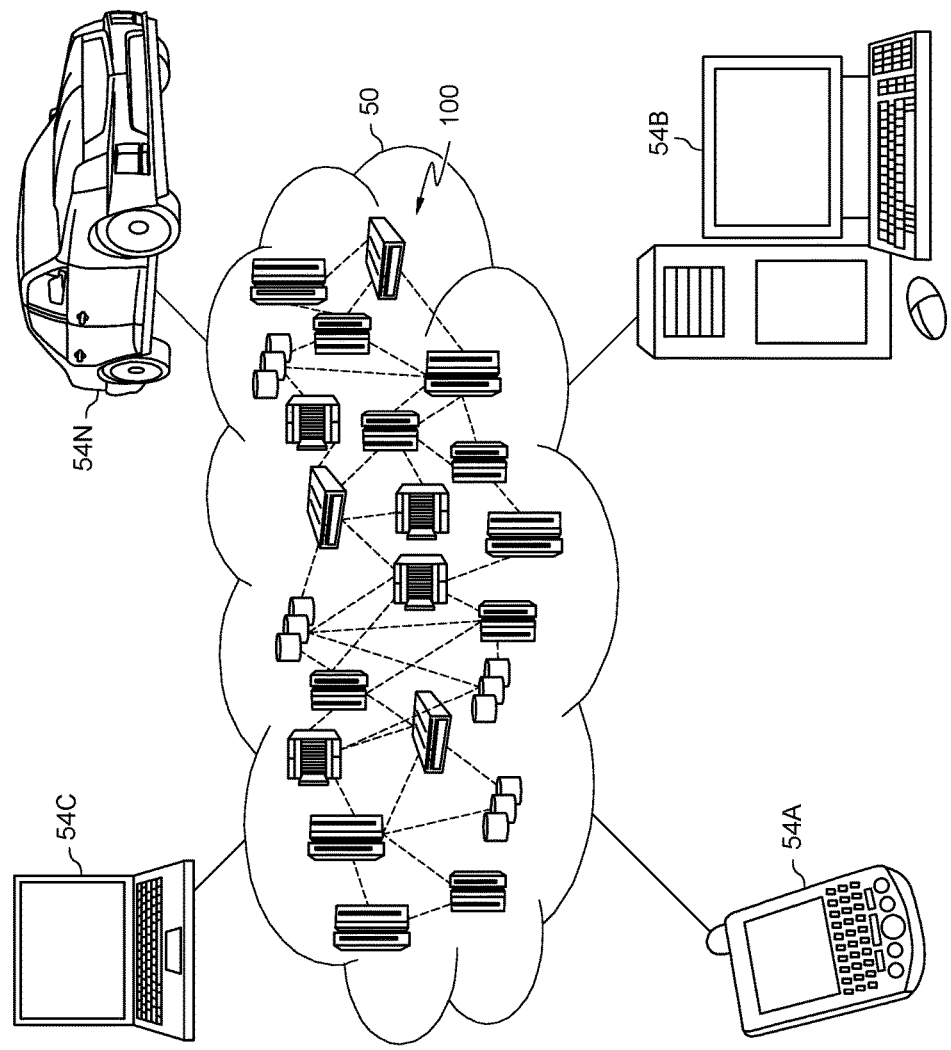
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
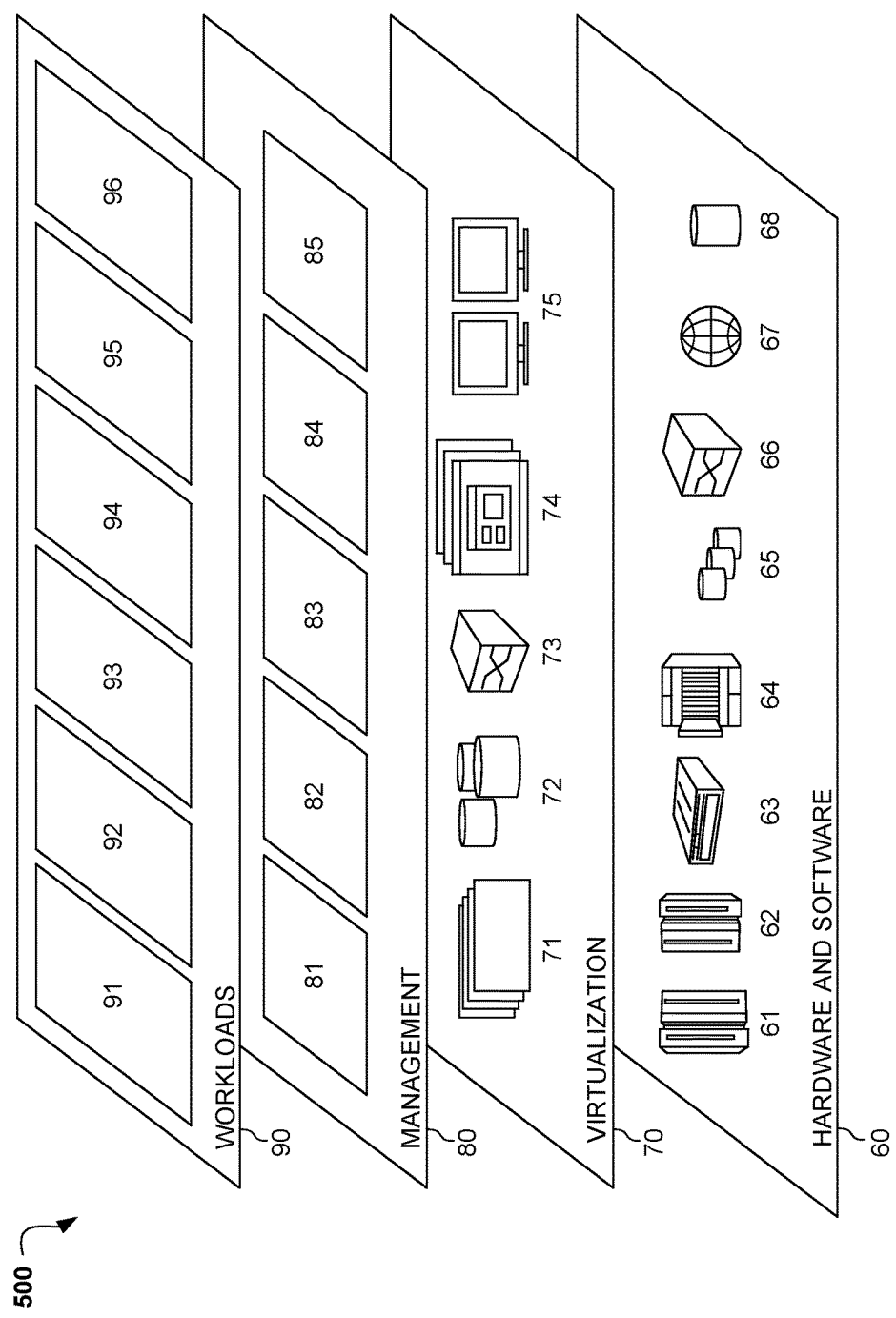
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-document summarization 96. Multi-document summarization may relate to selecting sentences from within a corpus, generating various candidate summaries of the corpus using a cross entropy method, calculating a quality score for each of the various candidate summaries, presenting, to a user, the summary with the highest calculated quality score that also satisfies a quality score threshold.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating a multi-document summary, the method comprising:

receiving, by a processor, a query statement, one or more documents, one or more summary constraints, and one or more goals;

identifying one or more keywords within the query statement;

performing a sentence selection from the one or more documents based on the one or more identified keywords;

generating a plurality of candidate summaries of the one or more documents based on the performed sentence selection, the one or more goals, and a fully-polynomial randomized approximation scheme (FPRAS) cross entropy method;

calculating a quality score for each of the plurality of generated candidate summaries using a plurality of quality features; and selecting a candidate summary from the plurality of generated candidate summaries with the highest calculated quality score that also satisfies a quality score threshold.

2. The method of claim 1, further comprising:

generating an expanded query statement using a plurality of query expansion techniques, wherein the expanded query statement comprises the one or more identified keywords and one or more other keywords related to the received query statement, and wherein the expanded query statement is used in the sentence selection.

3. The method of claim 1, further comprising:

restructuring a sentence structure of the selected candidate summary using a plurality of natural language processing techniques.

4. The method of claim 1, further comprising:

presenting the selected candidate summary to a user, wherein the selected candidate summary is presented on a display screen of a user device through a graphical user interface.

5. The method of claim 1, further comprising:

extracting each candidate summary based on the quality score associated with each candidate summary satisfying a filter threshold;

identifying one or more frequently appearing sentences within plurality of filtered candidate summaries; and updating an algorithm used by the cross entropy method based on the one or more identified frequently appearing sentences.

6. The method of claim 1, wherein the plurality of quality features are selected from a group consisting of measuring a Bhattacharyya similarity between a unigram language model (LM) of the received query statement and a unigram LM of a candidate summary within the plurality of candidate summaries, measuring a relative mass that the candidate summary devotes to the received query statement, measuring to what extent the candidate summary generally covers the one or more documents, measuring a sentence diversity of each candidate summary by calculating a bigram LM entropy for each candidate summary, biasing the sentence selection towards one or more sentences that appear earlier in a containing document, and biasing the sentence selection towards one or more longer summaries that still satisfy a length constraint that contain few long sentences rather than a plurality of candidate summaries that contain many short sentences.

7. The method of claim 1, further comprising:

removing one or more candidate summaries from the plurality of generated candidate summaries that do not satisfy the one or more summary constraints.

8. A computer system for generating a multi-document summary, the computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

receiving a query statement, one or more documents, one or more summary constraints, and one or more goals;

identifying one or more keywords within the query statement;

performing a sentence selection from the one or more documents based on the one or more identified keywords;

generating a plurality of candidate summaries of the one or more documents based on the performed sentence selection, the one or more goals, and a fully-polynomial randomized approximation scheme (FPRAS) cross entropy method;

calculating a quality score for each of the plurality of generated candidate summaries using a plurality of quality features; and selecting a candidate summary from the plurality of generated candidate summaries with the highest calculated quality score that also satisfies a quality score threshold.

9. The computer system of claim 8, further comprising:

generating an expanded query statement using a plurality of query expansion techniques, wherein the expanded query statement comprises the one or more identified keywords and one or more other keywords related to the received query statement, and wherein the expanded query statement is used in the sentence selection.

10. The computer system of claim 8, further comprising:

restructuring a sentence structure of the selected candidate summary using a plurality of natural language processing techniques.

11. The computer system of claim 8, further comprising:

presenting the selected candidate summary to a user, wherein the selected candidate summary is presented on a display screen of a user device through a graphical user interface.

12. The computer system of claim 8, further comprising:

extracting each candidate summary based on the quality score associated with each candidate summary satisfying a filter threshold;

identifying one or more frequently appearing sentences within plurality of filtered candidate summaries; and updating an algorithm used by the cross entropy method based on the one or more identified frequently appearing sentences.

13. The computer system of claim 8, wherein plurality of quality features are selected from a group consisting of measuring a Bhattacharyya similarity between a unigram language model (LM) of the received query statement and a unigram LM of a candidate summary within the plurality of candidate summaries, measuring a relative mass that the candidate summary devotes to the received query statement, measuring to what extent the candidate summary generally covers the one or more documents, measuring a sentence diversity of each candidate summary by calculating a bigram LM entropy for each candidate summary, biasing the sentence selection towards one or more sentences that appear earlier in a containing document, and biasing the sentence selection towards one or more longer summaries that still satisfy a length constraint that contain few long sentences rather than a plurality of candidate summaries that contain many short sentences.

14. The computer system of claim 8, further comprising:

removing one or more candidate summaries from the plurality of generated candidate summaries that do not satisfy the one or more summary constraints.

15. A computer program product for generating a multi-document summary, the computer program product comprising:
> one or more computer-readable tangible storage media and program instructions stored on at least one of the one or more tangible storage media, the program instructions executable by a processor of a computer to perform a method, the method comprising:
> receiving a query statement, one or more documents, one or more summary constraints, and one or more goals;
> identifying one or more keywords within the query statement;
> performing a sentence selection from the one or more documents based on the one or more identified keywords;
> generating a plurality of candidate summaries of the one or more documents based on the performed sentence selection, the one or more goals, and a fully-polynomial randomized approximation scheme (FPRAS) cross entropy method;
> calculating a quality score for each of the plurality of generated candidate summaries using a plurality of quality features; and
> selecting a candidate summary from the plurality of generated candidate summaries with the highest calculated quality score that also satisfies a quality score threshold.

16. The computer program product of claim 15, further comprising:
> generating an expanded query statement using a plurality of query expansion techniques, wherein the expanded query statement comprises the one or more identified keywords and one or more other keywords related to the received query statement, and wherein the expanded query statement is used in the sentence selection.

17. The computer program product of claim 15, further comprising:
> restructuring a sentence structure of the selected candidate summary using a plurality of natural language processing techniques.

18. The computer program product of claim 15, further comprising:
> presenting the selected candidate summary to a user, wherein the selected candidate summary is presented on a display screen of a user device through a graphical user interface.

19. The computer program product of claim 15, further comprising:
> extracting each candidate summary based on the quality score associated with each candidate summary satisfying a filter threshold;
> identifying one or more frequently appearing sentences within plurality of filtered candidate summaries; and
> updating an algorithm used by the cross entropy method based on the one or more identified frequently appearing sentences.

20. The computer program product of claim 15, wherein the plurality of quality features are selected from a group consisting of measuring a Bhattacharyya similarity between a unigram language model (LM) of the received query statement and a unigram LM of a candidate summary within the plurality of candidate summaries, measuring a relative mass that the candidate summary devotes to the received query statement, measuring to what extent the candidate summary generally covers the one or more documents, measuring a sentence diversity of each candidate summary by calculating a bigram LM entropy for each candidate summary, biasing the sentence selection towards one or more sentences that appear earlier in a containing document, and biasing the sentence selection towards one or more longer summaries that still satisfy a length constraint that contain few long sentences rather than a plurality of candidate summaries that contain many short sentences.

* * * * *